(12) United States Patent
Shah et al.

(10) Patent No.: US 7,000,060 B2
(45) Date of Patent: Feb. 14, 2006

(54) METHOD AND APPARATUS FOR ORDERING INTERCONNECT TRANSACTIONS IN A COMPUTER SYSTEM

(75) Inventors: Paras A. Shah, Houston, TX (US); Ryan J. Hensley, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 368 days.

(21) Appl. No.: 10/259,241

(22) Filed: Sep. 27, 2002

(65) Prior Publication Data

US 2004/0064627 A1 Apr. 1, 2004

(51) Int. Cl.
*G06F 13/36* (2006.01)

(52) U.S. Cl. ............................ 710/310; 710/6; 710/306

(58) Field of Classification Search ................ 710/240, 710/244, 112, 310, 311, 316, 317, 52, 6, 306; 718/102, 100
See application file for complete search history.

(56) References Cited

U.S. PATENT DOCUMENTS

| | | | | |
|---|---|---|---|---|
| 5,870,567 A | * | 2/1999 | Hausauer et al. ............ 710/310 |
| 5,870,760 A | * | 2/1999 | Demers et al. ............. 707/201 |
| 5,996,036 A | * | 11/1999 | Kelly ......................... 710/110 |
| 6,157,977 A | * | 12/2000 | Sherlock et al. ............ 710/310 |
| 6,199,131 B1 | * | 3/2001 | Melo et al. ................. 710/107 |
| 6,230,228 B1 | * | 5/2001 | Eskandari et al. .......... 710/310 |
| 6,266,745 B1 | * | 7/2001 | de Backer et al. .......... 711/147 |
| 6,272,600 B1 | * | 8/2001 | Talbot et al. ............... 711/140 |
| 6,324,612 B1 | * | 11/2001 | Chen et al. ................. 710/306 |
| 6,615,295 B1 | | 9/2003 | Shah |
| 6,754,737 B1 | * | 6/2004 | Heynemann et al. ......... 710/39 |
| 6,801,976 B1 | * | 10/2004 | Creta et al. ................. 710/310 |
| 2002/0108004 A1 | | 8/2002 | Shah |
| 2003/0126029 A1 | | 7/2003 | Dastidar et al. |
| 2003/0126342 A1 | | 7/2003 | Shah et al. |
| 2004/0064626 A1 | | 4/2004 | Shah et al. |

OTHER PUBLICATIONS

PCI Special Interest Group; "PCI-X Addendum to the PCI Local Bus Specification"; PCI Special Interest Group; Revision 1.0a; Jul. 24, 2000; pp. 221-223.*
Iliadis et al.; "Resquencing delay for a queueing system with two heterogeneous servers under a threshold-type scheduling" (abstract only); Jun. 1998.*
Suk Lee et al.; "Intelligent performance management of networks for advanced manufacturing systems"; Aug. 2001.*

* cited by examiner

*Primary Examiner*—Rehana Perveen
*Assistant Examiner*—Ryan Stiglic (57) ABSTRACT

A system allows queuing interconnect transactions of a first transaction type and a second transaction type according to an interconnect protocol for a computer system with multiple nodes in a transaction order queue (TOQ). Interconnect transactions are dequeued from the TOQ and scheduled for a destination node through a buffer between the TOQ and a scheduler. Interconnect transactions of the first transaction type are blocked from the scheduler until all interconnect transactions scheduled for other nodes in the computer system have completed. No interconnect transactions are dequeued from the TOQ while an interconnect transactions of the first transaction type is blocked from the scheduler. The queuing technique imposes an additional ordering on interconnect transactions in addition to ordering rules of the interconnect protocol.

23 Claims, 5 Drawing Sheets

METHOD AND APPARATUS FOR ORDERING INTERCONNECT TRANSACTIONS IN A COMPUTER SYSTEM

CROSS-REFERENCE TO RELATED APPLICATIONS

The following related patent applications are hereby incorporated by reference as if set forth in their entirety:

U.S. patent application Ser. No. 09/749,111, now U.S. Pat. No. 6,615,295, filed Dec. 26, 2000;

U.S. patent application Ser. No. 09/779,424, published as U.S. Patent Application Publication No. 2002/0108004, entitled "Enhancement to Transaction Order Queue,"' filed Feb. 8, 2001;

U.S. patent application Ser. No. 10/038,844, published as U.S. Patent Application Publication No. 2003/0126342, entitled "System to Optimally Order Cycles Originating from a Single Physical Link," filed Dec. 31, 2001;

U.S. patent application Ser. No. 10/039,130, published as U.S. Patent Application Publication No. 2003/0126029, entitled "Inter-Queue Ordering Mechanism," filed Dec. 31, 2001; and U.S. patent application Ser. No. 10/259,215, published as U.S. Patent Application Publication No. 2004/0064626, entitled "Method and Apparatus for Ordering Interconnect Transactions in a Computer System," filed Sep. 27. 2002.

STATEMENTS REGARDING FEDERALLY SPONSORED RESEARCH OR DEVELOPMENT

Not applicable

REFERENCE TO A MICROFICHE APPENDIX

Not applicable

BACKGROUND OF THE INVENTION

1. Field of the Invention

The present invention relates to the field of interconnects for computer systems and in particular to ordering interconnect transactions in a multi-node computer system.

2. Description of the Related Art

Many industry standard and proprietary interconnects require transactions on the interconnect to be ordered according to certain rules to maintain memory consistency throughout the system, to enable proper functioning of cache coherency protocols, and to avoid livelock, deadlock, and other undesirable conditions. The PCI-X Extensions to the Peripheral Component Interconnect (PCI) specification allows for the general ordering rules to be relaxed for certain transactions, by specifying a "relaxed-ordering" attribute.

In a modern computer system, there is a great advantage to be gained by using the PCI-X relaxed ordering attribute. The PCI-X relaxed ordering attribute indicates that a PCI-X initiator can allow the data written to reach memory in any order. The attribute can be used for the "payload" part of an I/O transfer, which usually makes up the bulk of the I/O transfer from an I/O adapter. The performance gain can be attributed to at least three factors: First, by using the relaxed ordering attribute, cycles from one adapter are not blocked behind cycles from another adapter. Second, if multiple memory controllers exist in the computer system, write data can be sent to each memory controller simultaneously rather than waiting for each write to receive a completion notification before running the next. In a multiple memory controller system, memory can be "striped" across the memory controllers, so even a contiguous block of write data can target several separate memory controllers. Third, because each memory controller is typically an independent entity, the writes are processed much faster than if a single memory controller was processing the entire stream of writes.

Simply allowing relaxed order writes to be run whenever they occur can result in problems, however, because of the interaction of relaxed order write cycles with non-relaxed order (regular) writes. As the PCI-X specification outlines, relaxed order writes may pass regular order writes, but not vice-versa. Thus, relaxed order writes are free to be run when they are received by core logic comprising an I/O subsystem for a computer system. Regular order writes, however, must wait until ordering of all previously accepted writes is guaranteed before they can be run. The result is that under some circumstances a stream of relaxed order writes can starve one or more regular order writes, degrading system performance and potentially causing failures due to timeouts within the operating software. If the core logic simply runs relaxed order writes as soon as it receives them, it may starve out other regular order writes.

Transaction ordering queues (TOQs) are known for enforcing the ordering rules of interconnect protocols, ensuring that interconnect transactions will execute in an order consistent with the ordering rules. As such, not all interconnect transactions typically go into TOQs, but only those transactions for which ordering rules apply. Transaction ordering queues are typically implemented as first-in-first-out (FIFO) queues.

BRIEF SUMMARY OF THE INVENTION

A disclosed embodiment provides for a mechanism for imposing a stricter order on interconnect transactions than imposed by an interconnect protocol. This is accomplished by using a transaction order queue (TOQ) to order interconnect transactions. In one embodiment, if the interconnect transaction is of a second type and no interconnect transaction of a first type are in the TOQ, the interconnect transaction bypasses the TOQ. Enqueuing transactions in the TOQ imposes a stricter ordering than imposed by the interconnect protocol.

In one embodiment, a computer system with multiple nodes buffers an interconnect transaction of the first transaction type for a destination node, blocking the interconnect transaction from being scheduled for execution if the any interconnect transactions are still pending for nodes of the computer system other than the destination node. Only after all other interconnect transactions for all other nodes are complete is the buffered interconnect transaction allowed to be scheduled.

BRIEF DESCRIPTION OF THE SEVERAL VIEWS OF THE DRAWINGS

A better understanding of the present invention can be obtained when the following detailed description of the disclosed embodiments is considered in conjunction with the following drawings, in which.

DETAILED DESCRIPTION OF THE INVENTION

A technique is disclosed herein for enhancing the operation of computer system interconnects that use the extensions to the Peripheral Component Interconnect specification (hereinafter PCI-X interconnects), as well as logic circuits and signal protocols thereof. For illustrative purposes, embodiments are described herein for computer systems using Intel Corporation microprocessor architectures and certain terms and references are specific to such processor platforms. PCI-X and the enhancements described herein, however, are hardware independent, and may be used with any host computer designed for this interconnect standard. As will be appreciated by those skilled in the art of computer systems, the disclosed embodiments can be adapted and applied to any computer platform utilizing the PCI-X standard. Further, although the following is described in terms of PCI-X interconnects, other interconnect architectures and protocols, such as the PCI Express (formerly known as 3GIO) interconnect architecture and protocol being promoted by Intel Corporation, Hewlett Packard Corporation, Microsoft Corporation, IBM Corporation, and Dell Computer Corporation, could also be used. In addition, although the following is described in terms of relaxed order write transactions and regular order write transactions, other interconnect transaction types could be used.

Figure 1:
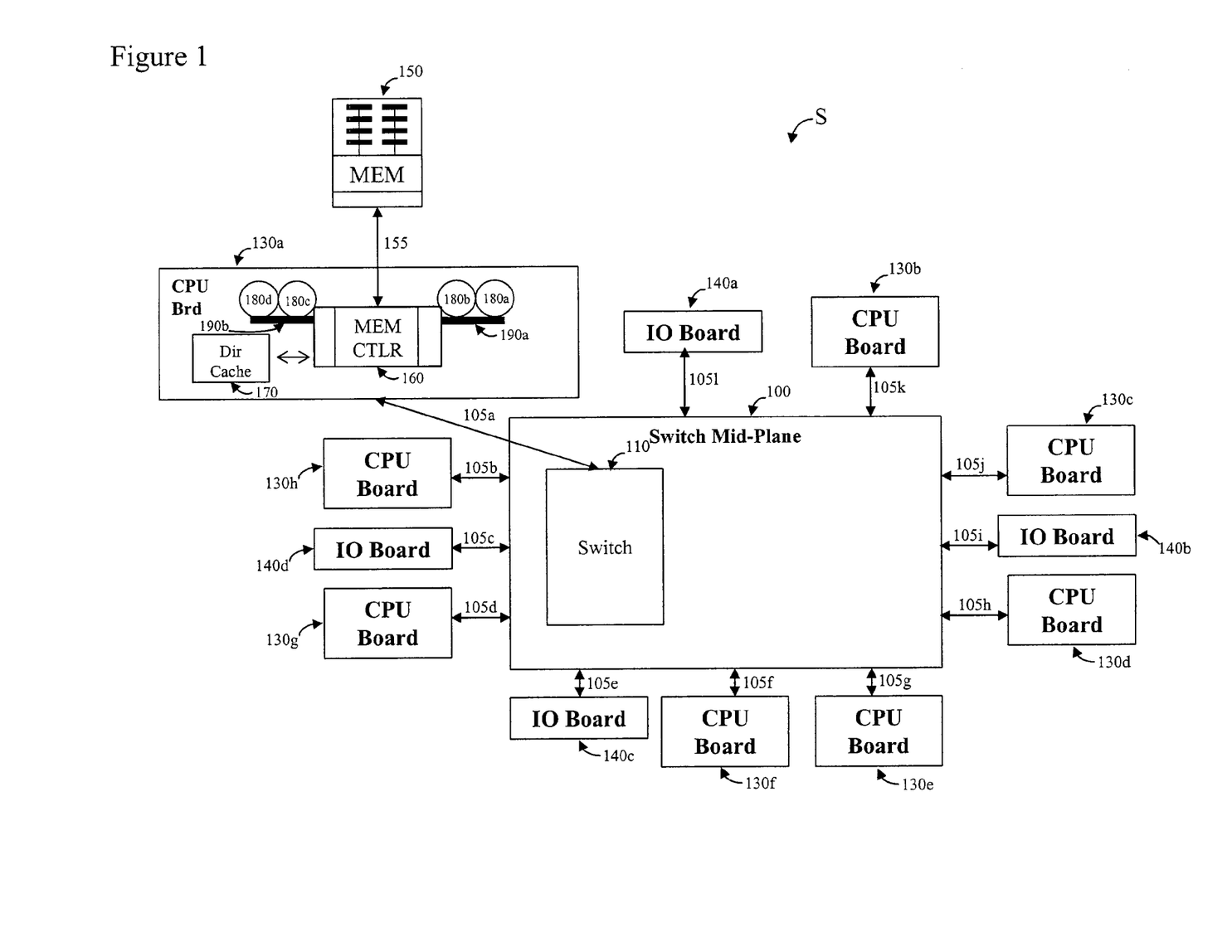
FIG. 1 is a block diagram of a multiple node computer system S according to one embodiment.

Turning to FIG. 1, a block diagram illustrates a multiple node computer system S according to one embodiment. A switch mid-plane 100 containing a switch 110 provides switched connectivity via busses 105a–105l between the CPU boards 130a–130h and I/O boards 140a–140d, each of which is a node of the computer system S. One skilled in the art will recognize that the number and arrangement of the CPU boards 130 and I/O boards 140 is illustrative and exemplary only, and other number and arrangements of CPU boards 130 and I/O boards 140 can be used. One feature of the switch 110 is that the switch 110 is non-ordering across nodes. Transactions passed to the switch 110 for different CPU or I/O boards can be processed in any order. However, the switch 110 is strongly ordered for transactions between the same source node and same destination node.

A typical CPU board 130a can contain multiple CPUs 180a–180d, connected to a memory controller 160 via host busses 190a–190b. The memory controller 160 is also typically connected to a cache 170 and a memory 150. In one embodiment, the host busses 190 are McKinley busses as defined by Intel Corporation. A high-speed memory bus 155 connects the memory controller 160 and the memory 150. The internal structure of the CPU boards 130 and the number of CPUs 180 and memories 150, types of host busses 190, cache 170, and memory controller 160 is not significant to the present invention. One skilled in the art will recognize that other elements, number and arrangement of elements in the CPU boards 130 can be used.

Figure 2:
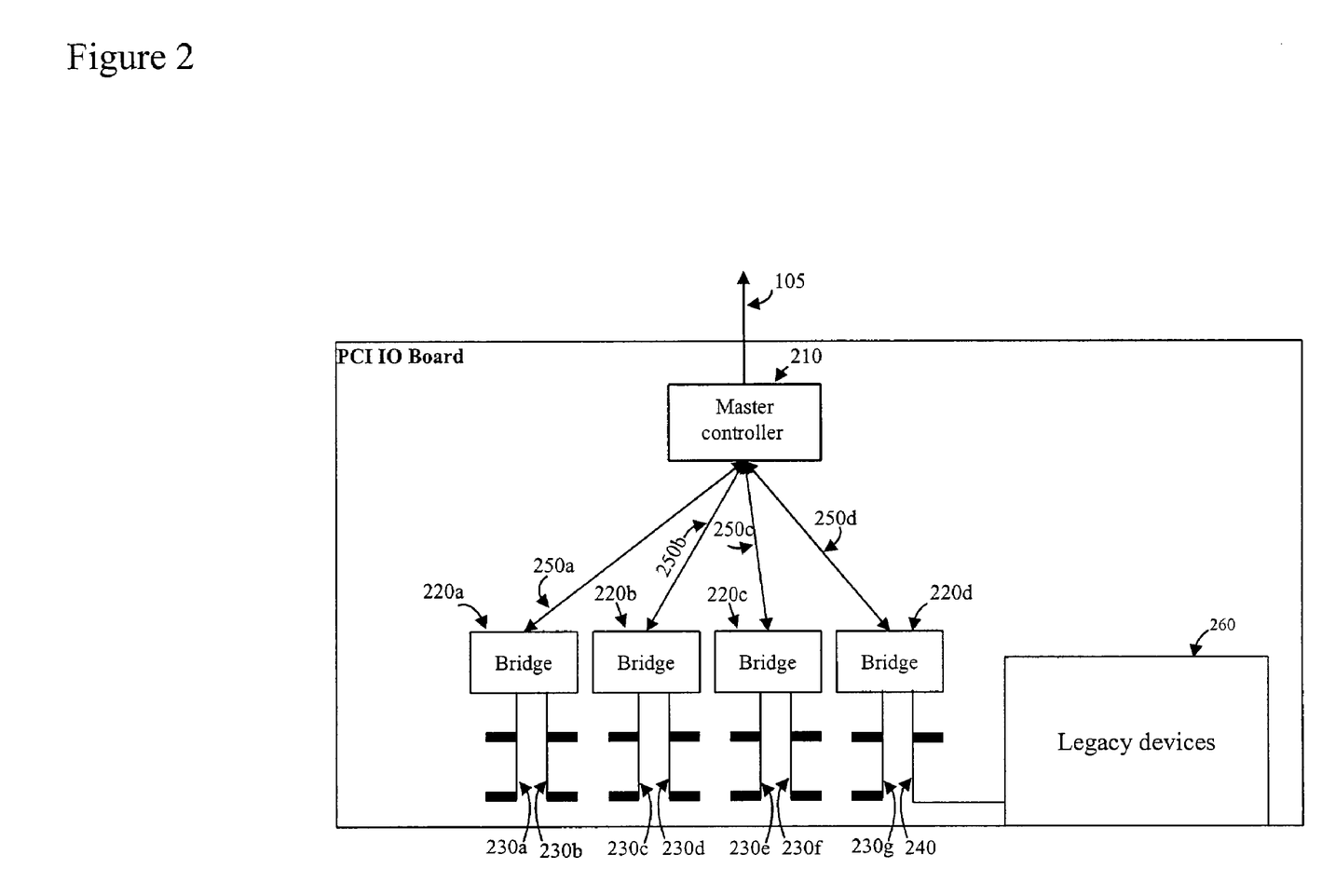
FIG. 2 is a block diagram of an I/O node of the computer system S of FIG. 1.

Turning to FIG. 2, a typical I/O board 140 of the embodiment of FIG. 1 is shown in greater detail. The I/O board 140 provides support for seven 100 MHz PCI-X busses 230a–230g, each of which can support two slots according to the PCI-X protocol, for a total of fourteen 100 MHz slots. In addition, a 33 MHz PCI bus 240 provides a single 33 MHz PCI slot, as well as connections to other legacy I/O devices 260, such as a serial controller. One skilled in the art will recognize that the numbers and speeds of PCI-X busses 230 are exemplary and illustrative only, and other numbers and speeds of PCI-X busses 230 can be used.

The PCI-X and PCI busses 230–240 are connected in pairs to PCI-X Host Bridges 220a–220d, which are in turn connected via host busses 250a–250d to a master controller 210. The master controller 210 is connected to the switch midplane 100 via a bus 105, as shown above in FIG. 1.

One skilled in the art will recognize that other elements, numbers of elements, and arrangements of elements can be used in the I/O board of FIG. 2. Further, although the I/O board of FIG. 2 is shown as a separate board in FIG. 1, the CPU and I/O boards can be integrated into a single board or multiple boards as desired.

In a conventional computer systems, a producer-consumer model can be used for interconnect transactions. An interconnect-connected device generating data is a producer, and a second interconnect-connected device is a consumer. The producer writes data for the consumer to read. In a single node system, transactions between producers and consumers are typically done using one or more "payload" transactions followed by a "flag" transaction. Once the payload transactions have been processed, the producer uses a "flag" transaction to write a flag. The consumer can poll or otherwise check for the flag, then process the data written in the payload transactions, which are completed before the flag transaction. Using PCI-X relaxed ordering transactions, the payload transactions can be sent as relaxed-order writes, followed by a non-relaxed order write for the flag. Because conventional PCI-X ordering rules prohibit the non-relaxed order write from passing the relaxed order writes, the consumer can safely read the payload data once the flag has been read.

However, in a multi-node computer system such as the system S of FIG. 1, the producer-consumer model can fail, because the switch 110 is non-ordering across nodes, without additional ordering constraints being imposed on interconnect transactions. If the flag transaction is destined for CPU board 130a, for example, while the payload transactions are destined for CPU board 130b, the flag transaction can be completed before the payload transactions complete. In such a race condition situation, seeing the completion of the flag transaction would not guarantee that the consumer could read the payload data, because it may not yet have been completely written by the producer. The producer-consumer model is a motivation of PCI-X ordering, not a further constraint on top of conventional PCI-X ordering. From a local point of view, because the switch 110 is non-ordering, the flag transaction and the payload transaction have no relationship inside the switch, but from a system point of view, flag transaction completion prior to payload transaction completion is a violation of PCI-X ordering rules, because essentially the flag write has passed the payload write. The I/O controller should realize this and ensure PCI-X ordering by imposing an ordering within the I/O controller.

The disclosed technique provides a way to maximize the performance of relaxed order writes while ensuring the producer-consumer model still works in a multi-node system. An additional ordering constraint is provided to ensure the integrity of the producer-consumer model. A regular order write is not allowed to execute with one destination node until all other write transactions have completed on all other nodes. By imposing this additional ordering, the relaxed order writes of the payload are ensured to complete before the regular order write of the flag is processed.

Turning to FIG. 2, a typical I/O board 140 of the embodiment of FIG. 1 is shown in greater detail. The I/O board 140 provides support for seven 100 MHz PCI-X busses 230a–230g, each of which can support two slots according to the PCI-X protocol, for a total of fourteen 100 MHz slots. In addition, a 33 MHz PCI bus 240 provides a single 33 MHz PCI slot, as well as connections to other legacy I/O devices 260, such as a serial controller The PCI-X and PCI busses 230–240 are connected in pairs to PCI-X Host Bridges 220a–220d, which are in turn connected via host busses 250a–250d to a master controller 210. The master controller 210 is connected to the switch midplane 100 via a bus 105, as shown above in FIG. 1.

One skilled in the art will recognize that other elements, numbers of elements, and arrangements of elements can be used in the I/O board of FIG. 2. Further, although the I/O board of FIG. 2 is shown as a separate board in FIG. 1, the CPU and I/O boards can be integrated into a single board or multiple boards as desired.

Figure 3:
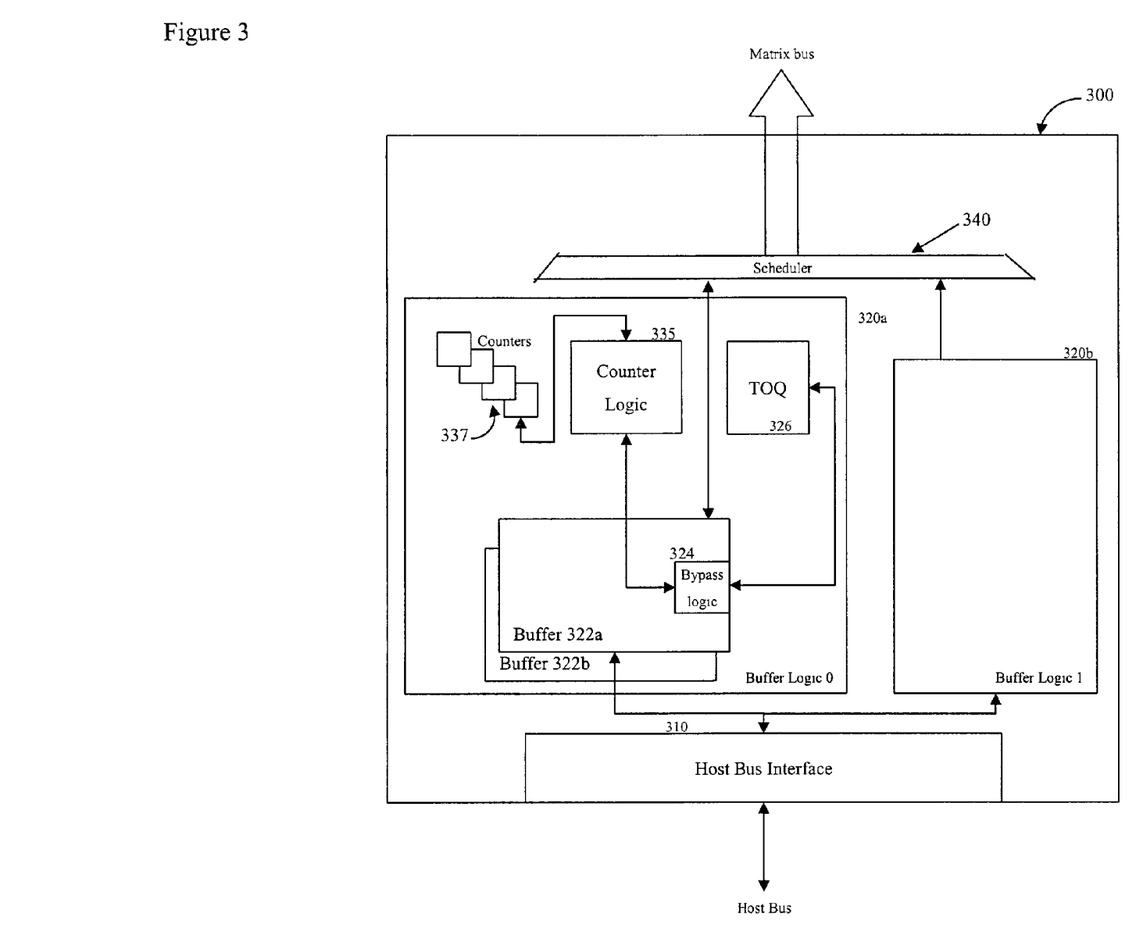
FIG. 3 is a block diagram of a master controller of the I/O node of FIG. 2 according to one embodiment.

Turning now to FIG. 3, a master controller 300 corresponding to the master controller 275 of FIG. 2 is illustrated. The master controller 300 as illustrated includes a host bus interface 310 for connecting to one of the PCI-X Host Bridges 220 via one of the host busses 250 of FIG. 2. Host bus interface 310 is connected to buffer logic 320a and buffer logic 320b, corresponding to the two PCI-X busses 230 attached to the PCI-X Host Bridge 220. Buffer logic 320b is identical to buffer logic 320a and operates in the same manner, and the internal structure of buffer logic 320b is omitted for clarity of the drawing. The discussion below will describe operation of the buffer logic 320a. Although only two buffer logics 320 are shown for clarity of the drawing, the master controller 275 illustrated in FIG. 2 contains eight buffer logics 320, two for each of the four host busses 250. One skilled in the art will recognize that other numbers of buffer logics can be used.

The buffer logic 320a includes a plurality of buffers 322. Although only two buffers 322a and 322b are shown for clarity of the drawings, one of skill in the art will recognize that any number of buffers 322 can be used. In one disclosed embodiment, four buffers 322 are used. Each of the buffers 322 contains a bypass logic 324, which is described in greater detail below. The buffer logic 320a also contains a transaction order queue (TOQ) 326, for ordering transactions in the buffers 322. A transaction received from the host bus interface 310a is stored in one of the buffers 322 before being scheduled by the scheduler 340. Transactions received from the host bus 310a are added to the TOQ 326 for ordering purposes after the transactions are stored in one of the buffers 322. As shown below, however, under certain circumstances, the TOQ 326 can be bypassed, such as when no write transactions are in progress in the master controller 300. Although the following description refers to transactions being "in the TOQ," the TOQ 326 typically does not store the transactions, but stores sufficient information about the transactions contained in the buffers 322 to allow ordering the transactions. Write transactions that are ordered by the TOQ 326 retain their relaxed or regular ordering attributes, allowing these transactions to be processed according to their transaction type at a later processing stage, so that relaxed order transactions can pass other transactions when desired. The TOQ 326 is typically implemented as a first-in-first-out (FIFO) queue.

Additionally, a counter logic 335 and counters 337 allow the buffer logic 320a to provide an additional ordering constraint, as described below. The counters 337 contain a counter for each other node in the computer system S. As shown in FIG. 1, there are four I/O boards 140 and eight CPU boards 130. Therefore, in a system as shown in FIG. 1, the master controller for an I/O node 140 contains eleven counters 337, one for each of the other eleven nodes. The counters 337 can be implemented as registers or in any other convenient manner.

The bypass logic 324 allows each of the buffers 322 to decide whether to bypass adding the transaction contained in the buffer to the TOQ 326 as described below. By adding relaxed order transactions to the TOQ 326, an additional ordering on transactions is imposed beyond the conventional PCI-X ordering rules, allowing the buffer logic 320a to avoid the undesirable starvation conditions described above. In one embodiment, the bypass logic incorporates a signal that indicates whether any regular order or relaxed order write transactions are awaiting scheduling or are in the TOQ 326, the signal being sent to all of the buffers 322. A signal that indicates whether any regular order or relaxed order write transactions are awaiting scheduling is sent to the TOQ 326.

Transactions can be dequeued from the TOQ 326 every clock cycle.

A counter logic 335 uses a set of counters 337 to block transactions from the scheduler 340. If a regular order write is buffered in one of the buffers 322 and is ready for scheduling, either by having been dequeued from the TOQ 326 or having bypassed the TOQ 326, and the counters 337 indicate that any write transactions are pending on any node other than the destination node of the buffered transaction, the counter logic prohibits the buffer logic 320 from passing the transaction to the scheduler 340. Although four counters 337 are shown in FIG. 3 for clarity of the drawing, the buffer logic 320a will have as many counters 337 as there are destination nodes in the computer system S. If the computer system S is configured such that not all nodes can be destination nodes, the number of counters provided can be less than the total number of nodes in the system. For example, using the system S of FIG. 1, if the system is configured such that there is no peer-to-peer I/O traffic, then only eight counters 337 are needed, corresponding to the number of CPU nodes 130, because no transactions from the I/O node 140 will have a destination node of the other three I/O nodes 140.

Each of the counters 337 is associated with one of the nodes of the computer system S, and counts the number of active transactions for that node from the interconnect bus 230 that is connected via an PCI-X Host Bridge 220 (FIG. 2) and host bus 250 to the host bus interface 310. If a regular order transaction in the buffer logic 320 is in a buffer associated with one of the nodes of the computer system S, then if the counters 337 indicate any write transactions pending or active for any of the destination nodes of the computer system S other than the destination of the transaction, the buffer logic 320 is blocked from scheduling the buffered dequeued transaction with the scheduler 340. Upon completion of a transaction from the interconnect bus 230, the counter logic 335 updates the counter 337 for the destination node. When the counters 337 indicate no write transactions are pending or active for any of the destination nodes of the computer system S other than the destination of the transaction, the buffer logic 520 is allowed to schedule buffered transactions that are otherwise ready for scheduling.

In one embodiment, the counters 337 are incremented when a transaction is scheduled by the scheduler 340 and decremented when the transaction completes on its destination node. In this embodiments each counter 337 is initialized to zero.

In another embodiment, negative logic within the counter logic 335 decrements the counters 337 associated with the destination node when a transaction is scheduled and increments the counter 337 when the transaction completes. Such negative logic can implement the counters 337 as n+1 bit counters, where $2^n$ transactions can be scheduled for the destination node. Incrementing the n+1 bit counter to the value $2^n$ causes bit n+1 of the counter to become a 1, allowing the blocking logic 335 to do a single bit check of bit n+1 to determine whether any transactions are active or pending for the associated node. In this embodiment, each n+1 bit counter 337 is initialized to the $2^n$ maximum value.

One skilled in the art will recognize that other counter implementations and counting techniques can be used.

Figure 4A:
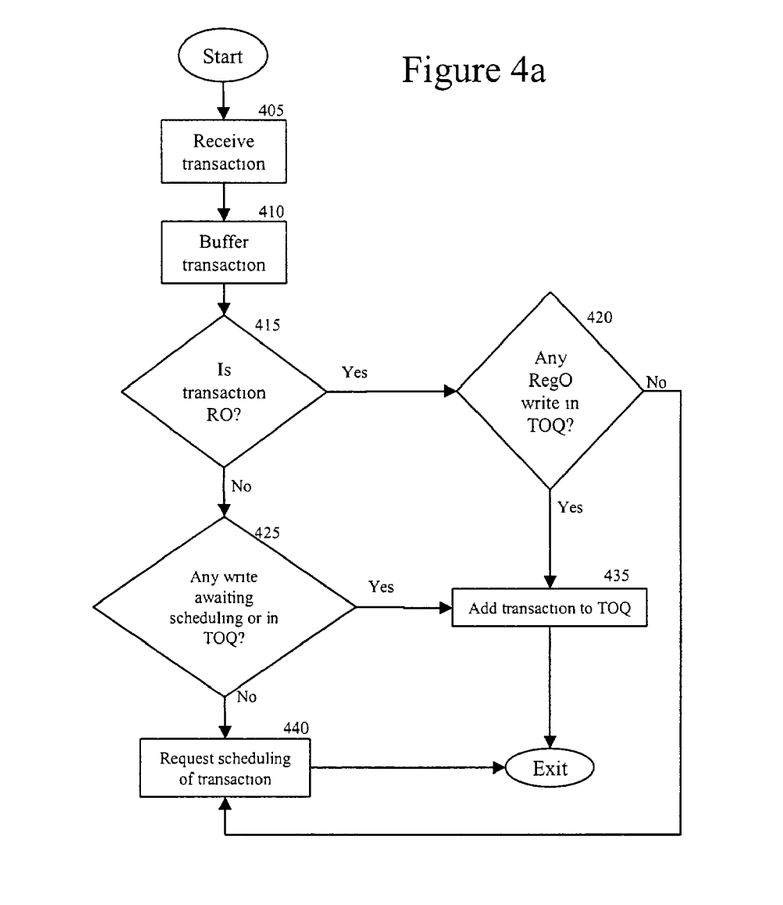
FIGS. 4a–4c are flowcharts illustrating exemplary steps in processing transactions using a transaction order queue (TOQ) according to the embodiment of FIG. 3.
Figure 4B:
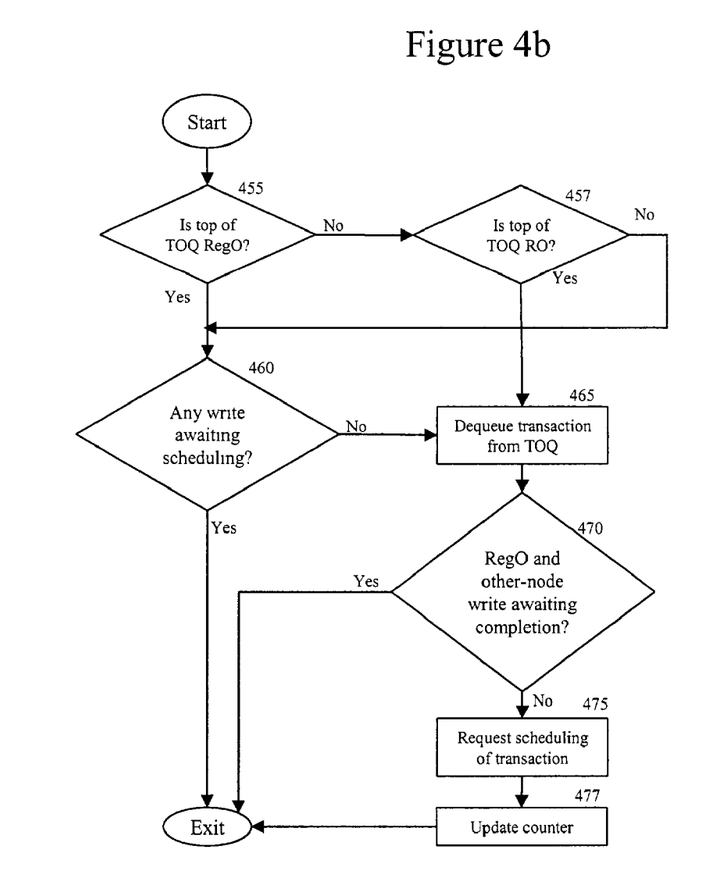
Figure 4C:
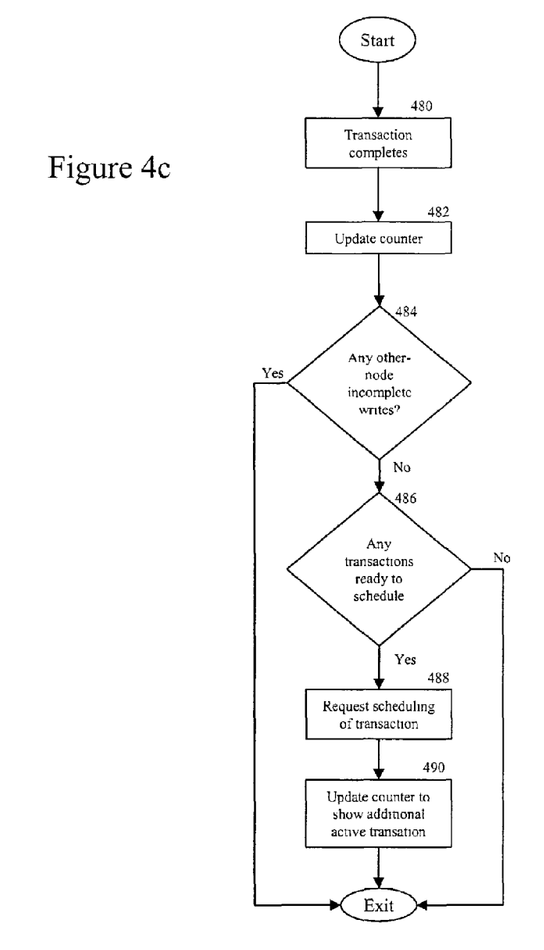

FIGS. 4a–4c are flowcharts illustrating exemplary steps in processing interconnect transactions according to the embodiment of FIG. 3, using the host interface 310 and buffer logic 320a. The technique illustrated by FIGS. 4a–4c allows maximization of the performance of relaxed order transactions, by allowing them to pass regular order transactions as allowed by the PCI-X protocol where the ordering allowed by the PCI-X protocol is sufficient to avoid a breakdown of the producer-consumer model and to avoid starvation of regular order transactions by a stream of relaxed order transactions. However, the technique provides a stricter ordering than the PCI-X protocol where the producer-consumer model would otherwise fail and where starvation of regular order transactions would be a concern. When the disclosed stricter ordering is imposed, the overall performance of the computer system is improved, yet the performance of relaxed order transactions is maximized within the stricter ordering, by allowing relaxed order transactions to pass other transactions using the looser PCI-X ordering once scheduled by the scheduler 340.

Corresponding steps are used for buffer logic 320b. One skilled in the art will recognize that the illustrated steps are exemplary and illustrative only and other steps and ordering of steps can be used. The following steps assume that the transactions are write transactions. Other types of transactions are buffered through the buffer logic 320 and ordered by the TOQ 326, but will not be further considered.

In step 405, an incoming transaction is received from the host interface 310. The incoming transaction is stored in one of the buffers 322 by the buffer logic 320a in step 410. Then, in step 415, the bypass logic 324 determines whether the incoming transaction is a relaxed order transaction, by checking the relaxed order attribute, as defined in the PCI-X Specification, a copy of which is incorporated in its entirety herein by reference. If the incoming transaction is a relaxed order transaction, then in step 420, the bypass logic 324 determines whether any regular order write transactions (which have the relaxed order attribute unset) are awaiting scheduling or are in the TOQ 326. If the no regular order writes are awaiting scheduling or are in the TOQ 326, then the relaxed order write can bypass the TOQ 326 and scheduling of the incoming transaction is requested in step 435.

If the incoming transaction is a relaxed order write and the TOQ 326 does contain regular order write transactions, then the incoming transaction is added to the TOQ 326 in step 435, to order it with the regular order write transaction, rather than bypassing the regular order write transaction. A transaction ordered in the TOQ 326 is not scheduled for execution until it is dequeued from the TOQ 326. This ensures that a stream of relaxed order transactions does not starve regular order transactions.

If the incoming transaction is a regular order transaction, then in step 425 the bypass logic 324 determines whether any write transactions are present in any of the buffers 322. If any write transactions are present, whether in the TOQ 326 or awaiting scheduling either after bypassing the TOQ 326 or being dequeued from the TOQ 326, the incoming write transaction is added to the TOQ 326 in step 435. Otherwise, the incoming transaction can be scheduled for execution in step 435. Thus, if no write transactions are in the buffer logic 320a, then the incoming transaction can be scheduled for execution without being ordered by the TOQ 326. However, if any write transactions are present in the buffer logic 320, an incoming regular order write is ordered by the TOQ 326 to preserve the conventional PCI-X ordering rules.

FIG. 4b illustrates exemplary steps for dequeuing transactions from the TOQ 326. In one embodiment, transactions can only be dequeued from the TOQ 326 if no other write transactions are awaiting scheduling. In this embodiment, in step 460, the TOQ 460 checks to see if any write transactions are awaiting scheduling in any of the buffers 322. If no write transactions are awaiting scheduling, then in step 465 the first or top transaction of the TOQ is dequeued, signaling the buffer 322. Then in step 470, if the dequeued transaction is a regular order transaction, the counters 337 are checked to see if any other destination node has incomplete write transactions directed toward it. If so, then the dequeued transaction is not passed to the scheduler for execution. If the dequeued transaction is relaxed order or the counters 337 indicate no incomplete write transactions destined for or outstanding to any different destination node, then in step 475, a request is made to schedule the dequeued transaction. Then in step 477, the counter 337 corresponding to the destination node of the dequeued transaction is updated to indicate an additional incomplete write transaction. If any transactions are awaiting scheduling in step 460, however, no transactions are dequeued until a later clock cycle.

In one embodiment, relaxed order transactions can be dequeued from the TOQ 326 even if other write transactions are awaiting scheduling. In steps 455–457, the TOQ 326 first checks to see if the transaction at the top of the TOQ 326 is a regular order transaction or a relaxed order transaction. If the transaction is a relaxed order transaction, then in step 465 it is dequeued from the TOQ 326 and steps 470–477 are performed as described above. This avoids a starvation condition which could occur where a relaxed order transaction in the TOQ 326 could be starved in the TOQ 326 by a stream of relaxed order transactions received from the PCI Interface that could bypass the TOQ 326 because no regular order transaction are in the TOQ 326.

In FIG. 4c, a series of steps for updating the counters 337 upon completion of a transaction. In step 480, a transaction completes, providing acknowledgement of completion through some type of response mechanism. Then in step 482, the counter 337 corresponding to the destination node of the completed transaction is updated. In step 484, the counters 337 are checked for any incomplete write transactions pending on other destination nodes. If no incomplete write transactions are pending, then in step 486 the buffers 322 are checked for transactions ready to schedule with the scheduler 340. If any such transaction is found, then in step 488 the transaction is passed to the scheduler 340 for execution and in step 490 the counter 337 corresponding to the destination node is updated to indicate an additional incomplete transaction for that node.

The scheduler 340 can select transactions for execution in any order after the buffer logic 320 has requested scheduling a transaction contained in one of the buffers 3202. Thus, the above technique ensures that ordering of regular order transactions is preserved, while allowing relaxed order transactions to bypass regular order and other relaxed order transactions, but undesirable conditions that would allow a stream of relaxed order writes to starve a regular order write transaction. Thus overall performance of the computer system S is enhanced by imposing the stricter transaction ordering in the buffer logic 320, while preserving the performance advantages of using relaxed order write transactions.

The foregoing disclosure and description of the disclosed embodiments are illustrative and explanatory thereof, but to the extent foreseeable, the spirit and scope of the invention are defined by the appended claims.

We claim:

1. A method of ordering interconnect transactions in a computer system having a plurality of nodes, comprising:
    (a) receiving an interconnect transaction from an interconnect interface, the interconnect interface operating according to an interconnect protocol;
    (b) identifying a transaction type of the interconnect transaction;
    (c) euqueueing the interconnect transaction as a queued transaction on a transaction ordering queue (TOQ), imposing a stricter ordering on the interconnect transaction than an interconnect-protocol-imposed ordering;
    (d) dequeuing the queued transaction from the TOQ as a dequeued transaction;
    (e) if the dequeued transaction is of a second transaction type, scheduling the dequeued transaction for a destination node of the plurality of nodes;
    (f) if the dequeued transaction is of a first transaction type and no transactions are active for any of the plurality of nodes other than the destination node, scheduling the dequeued transaction for the destination node;
    (g) if the dequeued transaction is of the first transaction type and any transactions are active for any of the plurality of nodes other than the destination node, blocking the dequeued transaction from scheduling until no transactions are active for any of the plurality of nodes other than the destination node; and
    (h) if the dequeued transaction is of the first transaction type and another transaction is active for the destination node but not for any of the plurality of nodes other than the destination node, scheduling the dequeued transaction for the destination node.

2. The method of claim 1, step (a) comprising:
    buffering the dequeued transaction in a buffer of a plurality of buffers; and
    if the interconnect transaction is of the second transaction type and no transactions of the first transaction type are in the TOQ and no transactions of the first type are awaiting scheduling in any of the plurality of buffers, bypassing steps (c)–(d) and handling the interconnect transaction as a dequeued transaction,
    wherein steps (e) and (f) schedule the dequeued transaction from the plurality of buffers.

3. The method of claim 1, wherein the interconnect interface operates according to the PCI-X extension of the PCI protocol.

4. The method of claim 3, wherein the second transaction type is a PCI-X relaxed ordering transaction type and the first transaction type is a non-relaxed ordering transaction type.

5. The method of claim 1, further comprising:
    counting dequeued transactions scheduled for the destination node; and
    counting dequeued transactions completed on the destination node.

6. The method of claim 5,
    wherein counting dequeued transactions scheduled for the destination node comprises:
        updating a counter associated with the destination node to indicate the dequeued transaction has been scheduled for the destination node;
    wherein counting dequeued transactions completed on the destination node comprises:
        updating the counter to indicate the dequeued transaction has been completed on the destination node.

7. The method of claim 6,
    wherein counting dequeued transactions scheduled for the destination node comprises:
        incrementing the counter;
    wherein counting dequeued transactions completed on the destination node comprises:
        decrementing the counter,
    wherein no transactions are active for any of the plurality of nodes other than the destination node if a counter associated with each of the plurality of nodes other than the destination node is zero, and
    wherein the counter associated with each of the plurality of nodes is initialized to zero.

8. The method of claim 6,
    wherein counting dequeued transactions scheduled for the destination node comprises:
        decrementing the counter;
    wherein counting dequeued transactions completed on the destination node comprises:
        incrementing the counter,
    wherein no transactions are active for any of the plurality of nodes other than the destination node if a counter associated with each of the plurality of nodes other than the destination node is a maximum value, and
    wherein the counter associated with each of the plurality of nodes is initialized with the maximum value.

9. A system for ordering interconnect transactions in a computer system with a plurality of nodes, comprising:
    an interconnect interface, coupled to an interconnect operating according to an interconnect protocol;
    a transaction ordering queue (TOQ), coupled to the interconnect interface, adapted to queue interconnect write transactions as queued write transactions of a first transaction type and a second transaction type, imposing a stricter ordering on the interconnect write transactions than an interconnect-protocol-imposed ordering, further adapted to dequeue a queued write transaction as a dequeued write transaction;
    a scheduler, adapted to schedule the dequeued write transaction from the TOQ;
    a plurality of buffers, the plurality of buffers coupled to the TOQ and the scheduler and adapted to buffer interconnect transactions for scheduling by the scheduler for a destination node of the plurality of nodes;
    circuitry to send the dequeued write transaction to the scheduler from the plurality of buffers; and
    circuitry to block the dequeued write transaction from the scheduler if the dequeued write transaction is of the first transaction type and any interconnect transactions are active on any of the nodes of the plurality of nodes other than the destination node.

10. The system of claim 9, the circuitry to send the dequeued write transaction to the scheduler from the plurality of buffers comprising:
 a plurality of counters, each of the plurality of counters associated with one of the plurality of nodes, each of the plurality of counters adapted to count active transactions scheduled on the associated node;
 circuitry to update the counter associated with the destination node of the dequeued write transaction when the dequeued write transaction is scheduled by the scheduler for the destination node; and
 circuitry to update the counter associated with the destination node when the dequeued write transaction is completed by the destination node.

11. The system of claim 10,
 wherein the circuitry to update the counter associated with the destination node when the dequeued write transaction is scheduled increments the counter, and
 wherein the circuitry to update the counter associated with the destination node when the dequeued write transaction is completed by the destination node decrements the counter.

12. The system of claim 10,
 wherein the circuitry to update the counter associated with the destination node when the dequeued write transaction is scheduled decrements the counter, and
 wherein the circuitry to update the counter associated with the destination node when the dequeued transaction is completed by the destination node increments the counter.

13. A system for ordering interconnect transactions in a computer system with a plurality of nodes, comprising:
 an interconnect interface, coupled to an interconnect operating according to an interconnect protocol;
 a transaction ordering queue (TOQ), coupled to the interconnect interface, adapted to queue interconnect transactions as queued transactions of a first transaction type and a second transaction type, imposing a stricter ordering on the interconnect transactions than an interconnect-protocol-imposed ordering, further adapted to dequeue a queued transaction as a dequeued transaction;
 a scheduler, adapted to schedule the dequeued transaction from the TOQ;
 a plurality of buffers, the plurality of buffers coupled to the TOQ and the scheduler and adapted to buffer interconnect transactions for scheduling by the scheduler for a destination node of the plurality of nodes;
 circuitry to send the dequeued transaction to the scheduler from the plurality of buffers; and
 circuitry to block the dequeued transaction from the scheduler if the dequeued transaction is of the first transaction type and any interconnect transactions are active on any of the nodes of the plurality of nodes other than the destination node,
 wherein the interconnect protocol allows interconnect transactions of the second transaction type to pass interconnect transactions of the first transaction type and interconnect transactions of the second transaction type, and
 wherein interconnect transactions of the second transaction type enqueued in the TOQ can not pass interconnect transactions of the first transaction type enqueued in the TOQ.

14. The system of claim 9, the TOQ comprising:
 circuitry to queue the interconnect write transactions in a first-in-first-out (FIFO) queue; and
 circuitry to dequeue a queued write transaction from the FIFO queue.

15. The system of claim 9,
 wherein the interconnect protocol is a PCI-X extension to a PCI protocol,
 wherein interconnect write transactions of the second transaction type have a PCI-X Relaxed Ordering attribute set in an attribute phase of the interconnect write transactions, and
 wherein interconnect write transactions of the first transaction type have the PCI-X Relaxed Ordering attribute unset in the attribute phase of the interconnect write transactions.

16. The system of claim 9, wherein interconnect write transactions of the second transaction type are not enqueued in the TOQ if no interconnect write transactions of the first transaction type are in the plurality of buffers and no interconnect write transactions of the first transaction type are in the TOQ.

17. The system of claim 9, wherein the interconnect interface, the TOQ, the scheduler, and the plurality of buffers are implemented in an application-specific integrated circuit (ASIC).

18. A controller for use in a system having a plurality of nodes, comprising:
 plural counters to track transactions pending or active for respective nodes;
 a transaction ordering queue (TOQ) to receive transactions that are of a first type or second type;
 a scheduler; and
 circuitry to:
  detect whether a first transaction in the TOQ destined for a first node is of the first type or second type; and
  in response to detecting that the first transaction is of the first type,
   block scheduling of the first transaction by the scheduler in response to determining that the counters associated with nodes other than the first node indicate transactions are pending or active for the respective nodes,
   enable scheduling of the first transaction by the scheduler in response to determining that the counters associated with nodes other than the first node indicate that no transactions are pending or active for the respective nodes.

19. The controller of claim 18, wherein the circuitry is adapted to enable scheduling of the first transaction by the scheduler in response to determining that the counters associated with nodes other tan the first node indicate that no transactions are pending or active for the respective nodes, even though the counter for the first node indicates that a transaction is pending or active for the first node.

20. The controller of claim 19, wherein the first transaction comprises a write transaction.

21. The controller of claim 20, wherein the first transaction of the second type comprises a PCI-X relaxed ordering write transaction,
 the circuitry to enable scheduling of the first transaction by the scheduler in response to detecting that the first transaction is of the second type.

22. The controller of claim 21, wherein the write transaction of the first type comprises a non-PCI-X relaxed ordering write transaction.

23. The controller of claim 20, wherein a write transaction of the second type is allowed to pass a write transaction of the first type.

* * * * *

UNITED STATES PATENT AND TRADEMARK OFFICE
CERTIFICATE OF CORRECTION

PATENT NO. : 7,000,060 B2
APPLICATION NO. : 10/259241
DATED : February 14, 2006
INVENTOR(S) : Paras A. Shah et al.

Page 1 of 1

It is certified that error appears in the above-identified patent and that said Letters Patent is hereby corrected as shown below:

In column 7, line 2, delete "embodiments" and insert -- embodiment, --, therefor.

In column 9, line 26, in Claim 1, delete "euqueueing" and insert -- enqueueing --, therefor.

In column 9, line 30, in Claim 1, delete "dequeuing" and insert -- dequeueing --, therefor.

In column 12, line 47, in Claim 19, delete "tan" and insert -- than --, therefor.

Signed and Sealed this

Nineteenth Day of May, 2009

JOHN DOLL
*Acting Director of the United States Patent and Trademark Office*